Sept. 6, 1932.    J. HUGHES    1,875,926
CARRYING OUT CHEMICAL REACTIONS IN WHICH REACTION GASES ARE CIRCULATED
Filed March 21, 1928
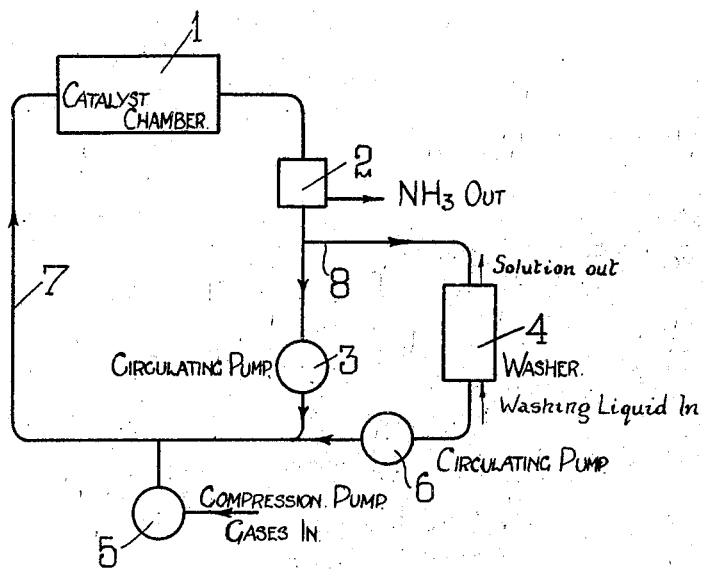
Inventor
Joseph Hughes
by Steward + McKay
his attorney Patented Sept. 6, 1932

1,875,926

UNITED STATES PATENT OFFICE

JOSEPH HUGHES, OF STOCKTON-ON-TEES, ENGLAND, ASSIGNOR TO IMPERIAL CHEMICAL INDUSTRIES LIMITED, OF WESTMINSTER, LONDON, ENGLAND, A BRITISH COMPANY

CARRYING OUT CHEMICAL REACTIONS IN WHICH REACTION GASES ARE CIRCULATED

Application filed March 21, 1928, Serial No. 263,598, and in Great Britain April 6, 1927.

In various chemical operations involving gaseous reagents there are present, or are produced, inert gases which take no part in the desired reactions and which interfere with the economic working of the process, especially in cases where the gases remaining after separation from the desired reaction products are circulated to undergo further reaction. Thus in the synthetic production of ammonia from hydrogen and atmospheric nitrogen, the argon introduced with the nitrogen and the methane introduced with the hydrogen, although present at the start in very small amounts, gradually accumulate as the pure nitrogen and hydrogen are removed in the form of ammonia and the residual unconverted gases are circulated with the addition of fresh quantities of argon- and methane-containing gases. It is therefore customary practice to avoid the undue accumulation of these inert gases by continuously or periodically purging away a portion of the circulating gas, but such purge gases are usually wasted as an efficient recovery of their valuable constituents has not hitherto been practicable. A similar problem arises in connection with other chemical processes, such as the production of methanol from carbon monoxide and hydrogen.

The above refers to cases in which the percentage of inert gases is relatively small e. g. 6%. A similar problem arises however when the percentage of inert gases is relatively high e. g. 25 per cent. This case occurs in the Bergius coal hydrogenation process. Here it is usual to reject the gases for hydrogenation purposes after one passage through the apparatus, though of course they may be used for other purposes.

According to the present invention the valuable constituents of the purge gases or in the case of coal hydrogenation of the initial gases are recovered by scrubbing the purge or initial gases under pressure, with a solvent, which dissolves inert gases such as methane and argon in greater proportion than hydrogen and nitrogen or hydrogen alone.

The solvent preferred is paraffin oil, or kerosene which may be defined as that fraction of oil derived from crude petroleum which is ordinarily used for illuminating purposes. The boiling point ranges from 170° C. to 300° C.

When using purge gases we prefer to treat the gases from a discontinuous purge with the solvent, as thereby a minimum of the circulating gases is lost. The conditions in the scrubbing towers are somewhat different from those ordinarily encountered in scrubbing towers inasmuch as it is not profitable to free the gases absolutely of inerts, but instead to remove, the greatest possible quantity of inerts per unit time. A high gas rate is used, since whatever the gas or liquor rate, the liquor always becomes saturated with hydrogen, so that the loss of hydrogen is constant while the amount of inert gas removed per unit time can be enhanced by increasing the gas rate without incurring a corresponding increase in loss of hydrogen. I have further found that by releasing the pressure on the washing kerosene, which is charged with gas, in stages, it is possible to secure at the various stages gases containing enhanced proportions of various constituents. Thus by reducing the pressure from 200 atmospheres to say 3 atmospheres, the gas evolved from kerosene used to scrub the purge from an ammonia synthesis plant contains the bulk of the absorbed methane, nitrogen and hydrogen. By further reducing the pressure to atmospheric a gas in which the argon-nitrogen ratio is greater than in the original mixture can be obtained. My invention therefore includes a process of recovering valuable gases from gases containing inert constituents, such as argon and methane, wherein the said gases are scrubbed with kerosene under pressure, in which the inert gases are absorbed and from which they are fractionally released by releasing the pressure in stages. The invention further includes the process of recovering and treating the absorbed gases as hereinafter described.

An example of an application of our invention is as follows:—

Purge gas from an ammonia synthesis plant operating at 200 atmospheres, containing about 5 per cent of inert gases, is scrubbed with kerosene in a tower at the rate of 10 M³ of oil per 1000—5000 M³ gas per hour. The temperature may be the normal, or advantageously somewhat lower e. g. 0° C. No special cooling of the absorption towers is necessary as the heat of solution appears to be negligible. The scrubbed gas, still at about 200 atmospheres pressure, is restored to the ammonia synthesis system. The scrubbing oil is collected in a let-down vessel and the pressure is let down in stages. The gas evolved by letting down to 3 atmospheres contains roughly 25 per cent methane, rather less nitrogen and about 40–50 per cent of hydrogen. Power may be recovered from the compressed paraffin by releasing the pressure in a Pelton wheel. The gas produced in the second let-down to atmospheric pressure is rich in argon, and after chemical removal of hydrogen and methane (by combustion with oxygen and removal of water and carbon dioxide) contains about 50–60 per cent of argon, the rest being nitrogen.

A further application of the invention to the treatment of gases from the hydrogenation of coal or oil may be cited. Coal is treated with pure hydrogen, or hydrogen containing small quantities of inert gases under the usual conditions of temperature and pressure. The gaseous resultants comprising hydrogen not entered into reaction and gases arising from the distillation of the coal, principally methane, are removed from the reaction vessel and are scrubbed under pressure with kerosene. The scrubbed gas is sent back to the reaction vessel.

The scrubbing oil employed in the process of my invention is the ordinary paraffin oil or kerosene of commerce, but closely related fractions of petroleum distillates or the like may also be used.

The accompanying flow sheet illustrates schematically the application of the invention to an ammonia synthesis plant.

Compressed nitrogen hydrogen mixture (containing small amounts of argon and methane) is supplied through compressor 5 to a circuit 7. It passes through the catalyst chamber 1 where partial conversion into ammonia occurs, and the ammonia removal device (liquefier or water scrubber) 2. Then the major portion (99%) of the gases passes through the circulating pump 3 while the remainder is purged away through pipe 8 and led to washer 4 where it is washed with kerosene to remove inerts, the residual hydrogen passing through the subsidiary circulation pump 6 back to the main circuit.

I declare that what I claim is:—

1. Process of treating gases comprising reactive gases and a small proportion of inerts which includes the steps of causing said gases to react with one another while circulating under pressure purging away part of the said gases, scrubbing the purge separately under pressure with a paraffin oil and returning the purge to said process.

2. Process of treating gases comprising reactive gases and a small proportion of inerts which includes the steps of causing said gases to react with one another while circulating under pressure, discontinuously purging away part of the said gases, scrubbing the purge separately under pressure with a paraffin oil and returning the purge to said process.

3. Process of treating gases comprising reactive gases and a small proportion of inerts which includes the steps of causing said gases to react with one another while circulating under pressure purging away part of the said gases, scrubbing separately under pressure with a non volatile solvent which preferentially dissolves the inerts, and returning the purified purge to said process.

4. Process of treating gases comprising reactive gases and a small proportion of inerts which includes the steps of causing said gases to react with one another while circulating under pressure, purging away part of the said gases, scrubbing separately under pressure with a non volatile solvent which preferentially dissolves the inerts, and returning the purified purge to said process without releasing pressure on same.

5. Process of treating gases comprising reactive gases and a small proportion of inerts, which includes the steps of causing said gases to react with one another while circulating under pressure, purging away part of the said gases, scrubbing separately under pressure with a non volatile solvent which preferentially dissolves the inerts, releasing pressure on the solution in stages, and collecting separately the gases evolved from each stage.

6. Process of ammonia synthesis which includes the steps of causing gases comprising nitrogen, hydrogen and a small proportion of inerts to interact while circulating under pressure, purging away part of the said gases, scrubbing the purge under pressure with paraffin oil, and returning the purge to said process.

In witness whereof, I have hereunto signed my name this 8th day of March 1928.

JOSEPH HUGHES.